US011873194B2

(12) United States Patent
Russwurm et al.

(10) Patent No.: US 11,873,194 B2
(45) Date of Patent: Jan. 16, 2024

(54) BRAKING DEVICE WITH AUTOMATIC RELEASABILITY IN ALL OPERATING SITUATIONS

(71) Applicant: Wittur Holding GmbH, Wiedenzhausen (DE)

(72) Inventors: Christoph Russwurm, Über-Grafendorf (AT); Herbert Karner, Saffen (AT); René Holzer, Scheibbs (AT); Karl Kriener, Viehdorf (AT)

(73) Assignee: Wittur Holding GmbH, Wiedenzhausen (DE)

( * ) Notice: Subject to any disclaimer, the term of this patent is extended or adjusted under 35 U.S.C. 154(b) by 54 days.

(21) Appl. No.: 17/621,047

(22) PCT Filed: Jun. 17, 2020

(86) PCT No.: PCT/EP2020/066754

§ 371 (c)(1),
(2) Date: Dec. 20, 2021

(87) PCT Pub. No.: WO2020/254399

PCT Pub. Date: Dec. 24, 2020

(65) Prior Publication Data

US 2022/0363514 A1 Nov. 17, 2022

(30) Foreign Application Priority Data

Jun. 18, 2019 (DE) ......................... 202019103423.8

(51) Int. Cl.
*B66B 5/18* (2006.01)

(52) U.S. Cl.
CPC ..................................... *B66B 5/18* (2013.01)

(58) Field of Classification Search
CPC ................ B66B 5/18; B66B 5/20; B66B 5/22
See application file for complete search history.

(56) References Cited

U.S. PATENT DOCUMENTS 8,939,262 B2 * 1/2015 Schienda ................. B66B 5/06 187/391

FOREIGN PATENT DOCUMENTS

| | | | |
|---|---|---|---|
| DE | 202015106237 | U1 | 2/2017 |
| DE | 202018104891 | U1 | 10/2018 |
| EP | 3281905 | A2 | 2/2018 |
| WO | 2005044709 | A1 | 5/2005 |

* cited by examiner

*Primary Examiner* — Diem M Tran

(57) ABSTRACT

A braking device for an elevator with a rail-guided car, which encompasses a guide rail and holds a braking element in position on one side of the guide rail and holds another braking element in position on the opposite side of the guide rail, wherein at least one of the braking elements is held in its standby position by a switchable retaining magnet against the force of an automatic actuator. The braking element is automatically driven in between the basic body and the guide rail, if the car moves at the point in time at which the braking element abuts against the guide rail. The retaining magnet is equipped with an air gap reducing agent, which reduces or eliminates an air gap between the retaining magnet and the braking element such that the retaining magnet keeps the braking element magnetically trapped again, as soon as it is switched accordingly.

8 Claims, 9 Drawing Sheets

BRAKING DEVICE WITH AUTOMATIC RELEASABILITY IN ALL OPERATING SITUATIONS

The invention relates to a braking device.

TECHNICAL BACKGROUND

Braking devices and safety gears for elevators are known in various forms. In most cases, such braking devices or safety gears are based on the wedge principle. Upon triggering, at least one braking element or a part thereof is driven into a gap narrowing in the relevant direction of travel and thus exerts a self-reinforcing braking force. In order to enable further travel, the braking element must be released from the gap and then brought back into its standby position.

The majority of the currently known braking devices and safety gears require manual intervention for this. The car is moved in the opposite direction, releasing the braking element. Then the braking element is manually returned to its standby position and correctly positioned there.

Braking devices and safety gears of current construction, however, are already designed in such a way that after braking or after catching a fully automatic return of the braking element to its standby position is possible. These braking devices and safety gears are usually designed in such a way that the movement which drives the braking element into the wedge gap is also used to prepare the subsequent return of the braking element to its standby position, i.e. to generate a corresponding relative movement. During the movement of the car in the opposite direction, which is necessary for releasing the braking element from the wedge gap, the braking element can then immediately be returned to its standby position.

With such currently known braking devices and safety gears, however, the problem arises that for resetting it is essential that the braking element has even been driven into the wedge gap. In all those cases in which the brake was activated, but there was no braking effect because the braking element has not been driven in, special measures must be taken to enable, nevertheless, an automatic reset.

In the case of the known braking devices and safety gears, the procedure is therefore such that, even if there is no braking effect after the brake has been activated, first of all, the braking effect is produced specifically for the purpose of resetting. For this purpose, the car is moved further so that the braking element is driven in and, in so doing, generates or drives each relative movement that prepares the subsequent return of the braking element to its standby position. The car is then moved in the opposite direction in order to release the braking element from its driven-in position again. Only then will the braking element be returned. The process is time-consuming and involves the risk of unnecessary wear and tear on the guide rails, since in fact unnecessary braking is carried out just to prepare the automatic release.

The Object of the Invention

Against this background, the object of the invention is to provide a braking device which—if it has been activated, but has produced no braking effect or only a slight braking effect—can be reset easily, quickly and without the risk of unnecessary wear occurring on the guide rails.

The Inventive Solution

The progressive safety gear according to the invention for an elevator with a rail-guided car has a basic body for (usually floating) mounting on the car or counterweight. When properly assembled, the basic body encompasses a rail. It holds a braking element on one side of the rail in a ready-to-brake position. It holds another braking element on the opposite side of the rail in a ready-to-brake position.

In this case, at least one of the braking elements is held at a distance from the rail in its standby position against the force of an automatic actuator by means of a switchable retaining magnet. The latter holding takes place in such a way that, when switching the retaining magnet, the braking element is pressed by the actuator against the rail, away from the retaining magnet. This leads to an air gap between the retaining magnet and the braking element or such an air gap becomes larger.

In all of this, the braking device is designed in such a way that the braking element is automatically driven in between the basic body and the rail, if the car moves more than insignificantly at the point of time at which the braking element abuts against the rail.

According to the invention, the retaining magnet is equipped with an air gap reducing agent, by means of which the air gap between the retaining magnet and the braking element which has not yet or only slightly been driven in between the rail and the basic body can be reduced or eliminated in such a way that the retaining magnet again holds the braking element magnetically trapped on it, as soon as it has been switched back to “hold”.

With the help of the air gap reducing agent, the brake can even be reset fully automatically without any problems if it has responded, but no significant braking effect has developed because the braking element or its component intended for this in the form of a brake wedge or a brake roller has not been driven into the gap between its basic body and the guide rail. The air gap between the retaining magnet and the braking element, which prevents the braking element or its corresponding component from being simply attracted again in this situation, is reduced or even eliminated by the air gap reducing agent to such an extent that the retaining magnet can again magnetically attract the braking element with sufficient strength—in order to bring it back to its standby position during this process or afterwards.

According to the invention, in a braking device working with a retaining magnet, the possibility now arises for the first time to switch the braking device (including the retaining magnet) to a completely currentless mode as soon as the elevator system is in stand-by mode, for example during the less frequented night hours. The fact that the braking element or a corresponding component of the braking element is brought to abut against the guide rail is no longer disadvantageous. This is because, according to the invention, a fully automatic return is also possible from this position without first having to trigger the brake, which is costly and subject to wear.

Particularly Preferred Embodiment

Preferably, the air gap reducing agent is implemented by a guide along which the retaining magnet can be moved in and opposite the direction of the braking element resting on the rail (in other words, mostly perpendicular to the direction of travel of the car) and by a drive causing such a displacement.

In this way, by bringing the retaining magnet close to the braking element or the part of the braking element to be attracted by the retaining magnet, the air gap can be reduced or eliminated in a particularly effective way. In addition, in this way the actuator can be returned very easily to the standby position. If the actuator is, for example, a compression spring, the latter can be tensioned again by reducing the air gap or by moving the retaining magnet, which in turn holds the braking element, back to its standby position and, in doing so, the compression spring is prepared for its next use.

Ideally, the drive comprises a motor-driven screw spindle. As a rule, there is also a rotary spindle motor which turns part of the screw spindle such that the screw spindle is lengthened or shortened, depending on the direction of rotation of the motor. In this way, a large transmission ratio can be achieved very easily. A very small motor is then sufficient to apply the comparatively large force that, for example, is necessary to tension the actuator again. Another reason for keeping the spindle motor very small is that, due to the comparatively short switch-on time per application, thermal aspects only have to be taken into account to a limited extent. In other words, it can be operated in a load range (overvoltage, overcurrent) that would have to be avoided in the event of longer periods of operation, since the spindle motor would then overheat.

It is particularly favourable, if the screw spindle is designed to be self-locking, in such a way that it does not begin to rotate in the direction of its longitudinal axis under the influence of pure forces. This contributes significantly to save energy. Because this means that the spindle motor can remain de-energized for most of the time and only needs to be energized briefly when it is to actively rotate.

It is particularly advantageous, if the drive and actuator are designed and configured in such a way that the drive also re-tensions the actuator when it eliminates the air gap of the retaining magnet, for example by pulling the retaining magnet together with the braking element away from the rail.

Together with what has already been claimed, protection is also claimed for an elevator which has a car moving along guide rails, preferably in the vertical direction along an elevator shaft, and a counterweight which are connected to one another via a supporting element. It can preferably, but not exclusively, be a traction elevator. The elevator is characterized in that its car has a braking device according to one of the claims mentioned.

Another Aspect of the Invention

A further, independent aspect of the invention is to provide a method for automatically deactivating a braking device of an elevator that has applied during standstill or during minimum travel, with the braking element of the braking device being held in regular operation by a retaining magnet in its standby position, at a distance from the rail, against the force of an actuator and said braking element having not yet been driven in between the rail and the basic body.

According to the invention, the object is achieved with the following steps:

- activating an air gap reducing agent so that it moves from its standby position into its working position, in which it eliminates the air gap between the braking element and the retaining magnet without requiring a relative movement between the braking element and the rail, or reduces it to the extent that the retaining magnet holds the braking element magnetically trapped again and, ideally, the actuator is tensioned again.
- deactivating the air gap reducing agent so that it moves from its working position to its standby position and, in so doing, moves the braking element to its standby position, in which it is held by the retaining magnet in its standby position, at a distance from the rail, against the force of an actuator.

Alternatively, this process could also be described and thus claimed with the following wording:

Method for automatically deactivating a braking device of an elevator that has applied during standstill or during minimal travel, with the braking element of the braking device being held in regular operation by a retaining magnet in its standby position, at a distance from the rail, against the force of an actuator and said braking element having not yet or only slightly been driven in between the rail and the basic body, comprising the following steps:

- activating an air gap reducing agent so that it moves from its standby position into its working position, in which it eliminates the air gap between the braking element and the retaining magnet without requiring a relative movement between the braking element and the rail, or reduces it to the extent that the retaining magnet holds the braking element magnetically trapped again.
- deactivating the air gap reducing agent so that it moves from its working position to its standby position and, in so doing, moves the braking element to its standby position, in which it is held by the retaining magnet in its standby position, at a distance from the rail, against the force of an actuator.
- during the deactivation of the air gap reducing agent, the actuator is preferably also tensioned.

Another method that is also claimed is a method for energy-saving stand-by operation of an elevator with a braking device electromagnetically held in its standby position. The process consists of the following steps:

- activating a drive that moves the retaining magnet of the braking device, together with the braking element held by it or the part held by it, in the direction of the rail until the part of the braking element intended to be driven in between the basic body and the guide rail in normal braking operation rests on the rail.
- then de-energizing the retaining magnet for the duration of the standby operation that is now beginning.
- at the end of standby operation, the retaining magnet is re-energized.

Then reactivation of the drive in the opposite direction and again lifting said part of the braking element from the rail and returning this part of the braking element to its standby position.

Particularly Preferred Embodiment

Particularly preferred embodiments for the method according to the invention are as follows:

The elimination of the air gap is carried out in such a way that the actuator is brought back into its standby mode, preferably by being tensioned with the application of force.

Ideally, one of the agents disclosed by this application is used as the air gap reducing agent.

Further embodiments, modes of operation and advantages result from the following description of an embodiment with reference to the figures.

LIST OF FIGURES

Figure 9:
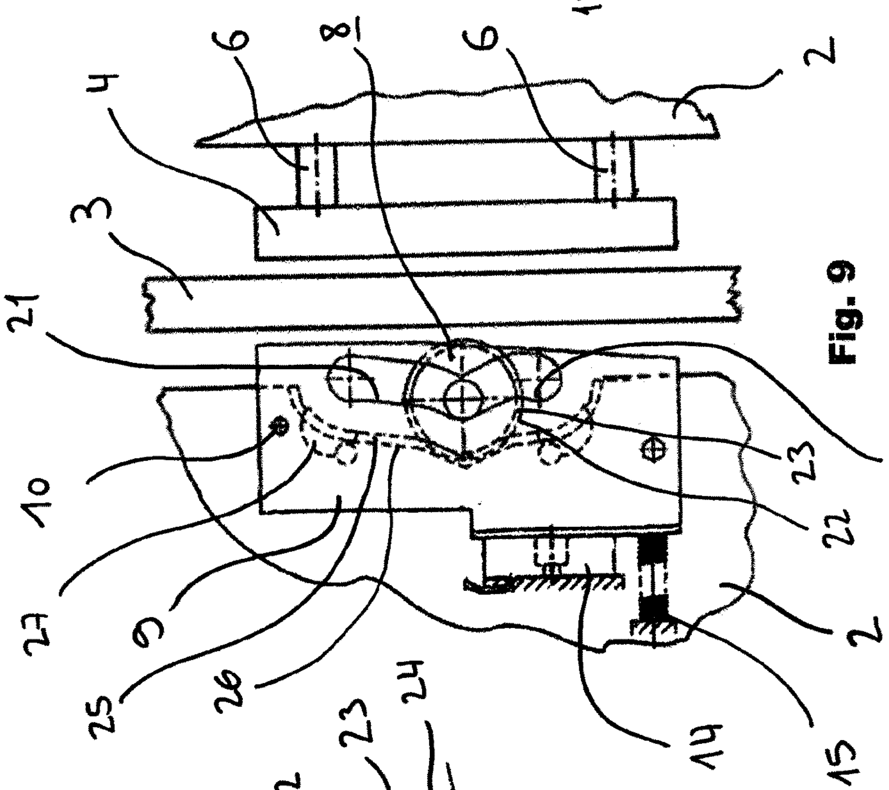

For the purpose of explaining the basic, preferred functional principle, FIG. 9 shows a schematic drawing of a corresponding braking device in standby mode.

Figure 10:
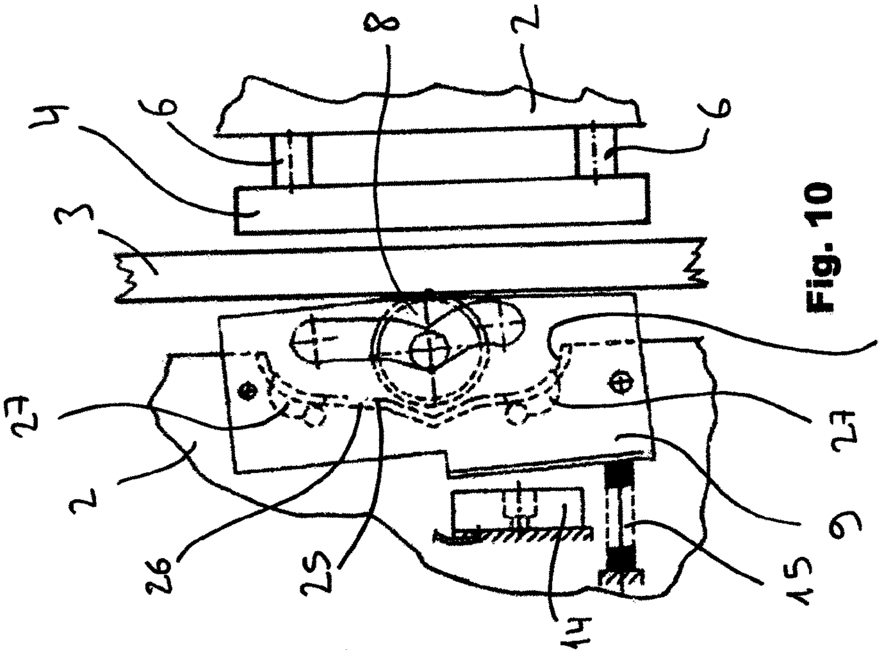

For the purpose of explaining the basic, preferred functional principle, FIG. 10 shows a schematic drawing of a corresponding braking device in the state just triggered, even before the braking roller is driven into the gap between the basic body 2 and the guide rail 3.

Figure 11:
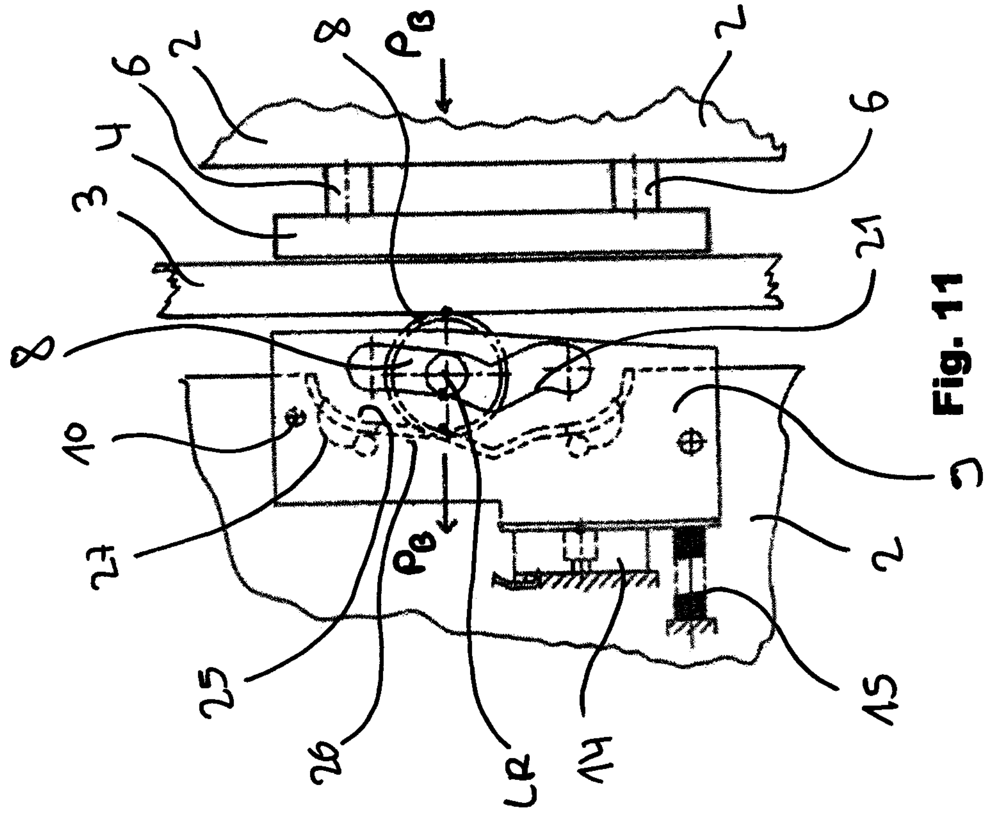

For the purpose of explaining the basic, preferred functional principle, FIG. 11 shows a schematic drawing of a corresponding braking device right during the driving in of the brake roller into the gap between the basic body 2 and the guide rail 3, when traveling downwards.

Figure 12:
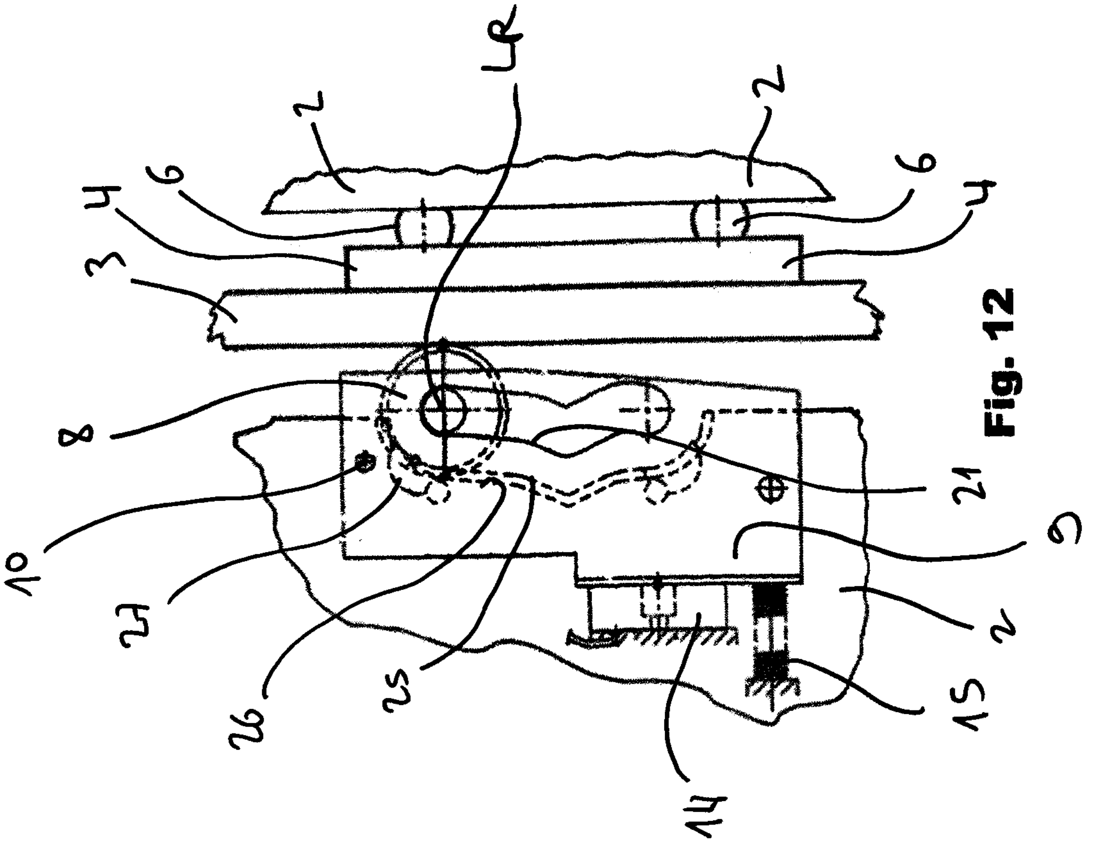

For the purpose of explaining the basic, preferred functional principle, FIG. 12 shows a schematic drawing of a corresponding braking device which has been caught and in which the brake roller has therefore been fully driven in.

Figure 13:
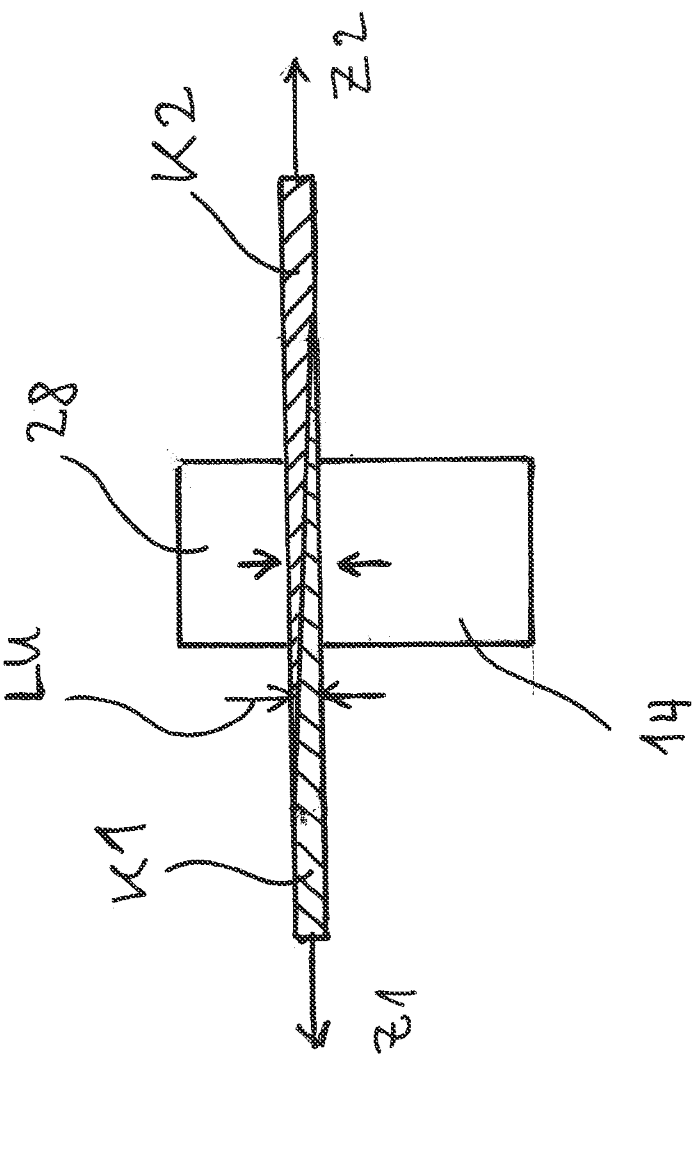

FIG. 13 shows the functional principle of a conceivable alternative solution for the air gap reducing agents claimed.

PREFERRED EMBODIMENT

Overview of the Construction

Figure 1:
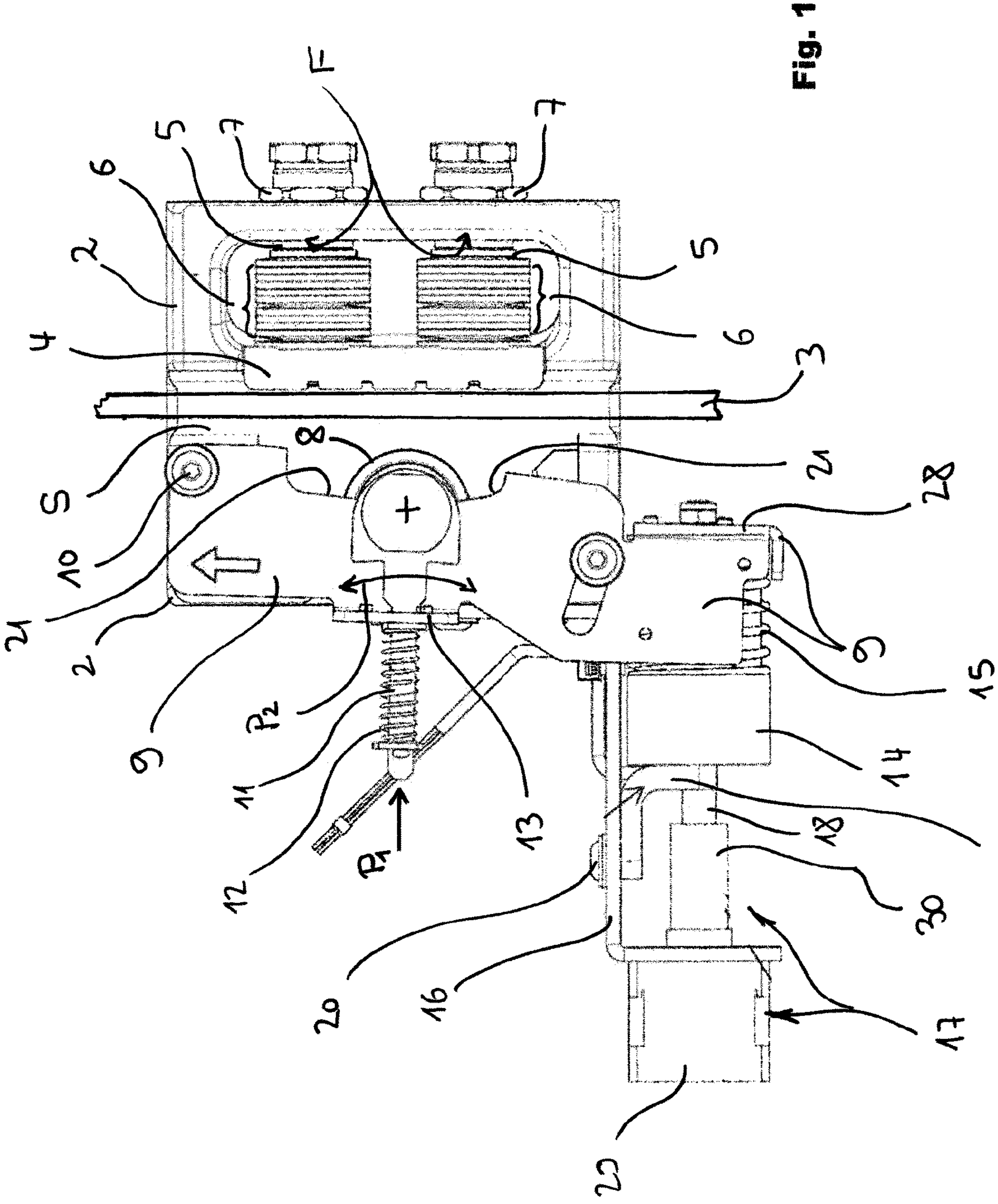
FIG. 1 shows a lateral view of a braking device according to the invention in its standby position, in which the retaining magnet holds the braking element assigned to it in its standby position.
Figure 4:
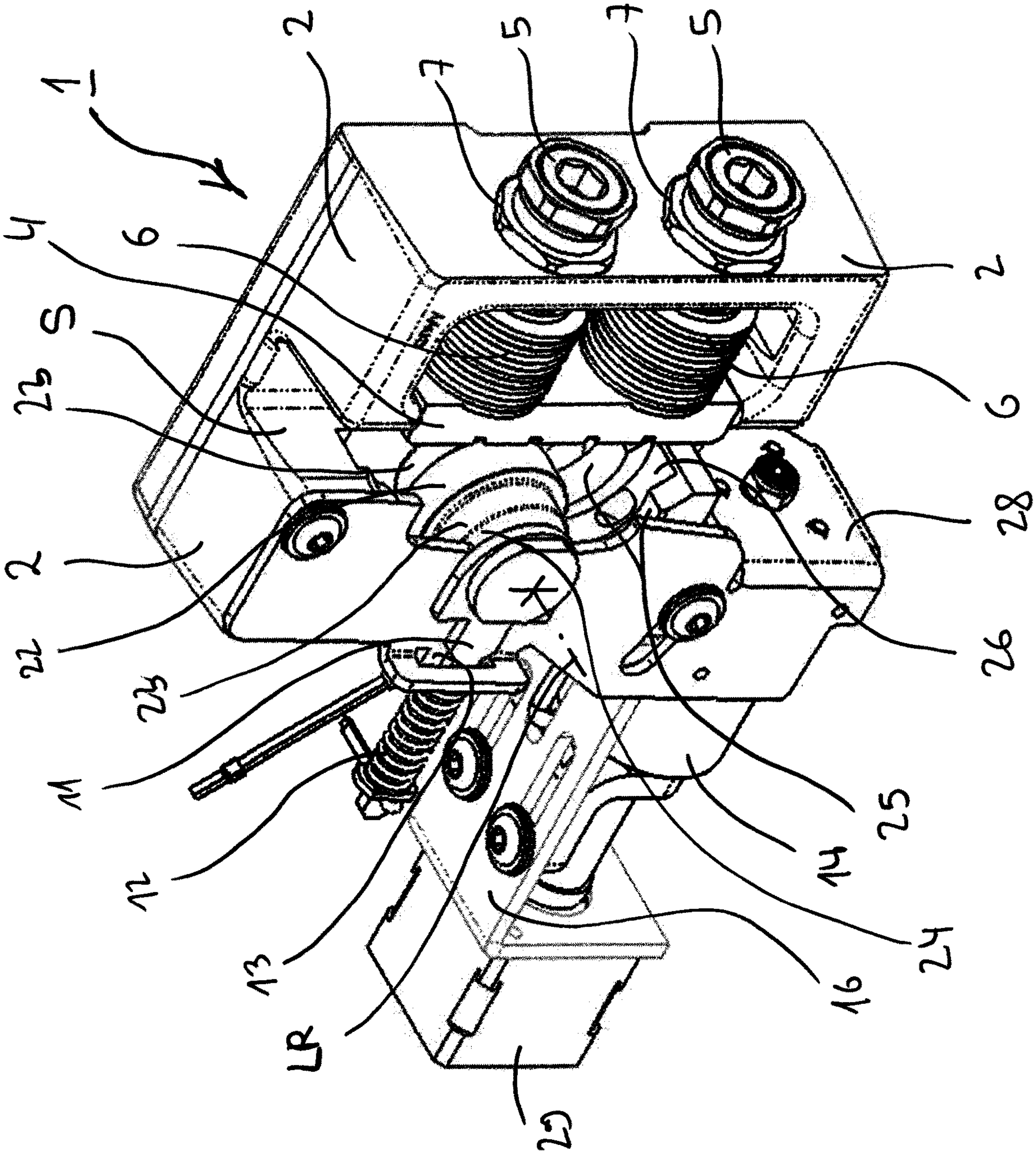
FIG. 4 shows the braking device according to the invention according to FIG. 1 in a perspective view from the front.
Figure 5:
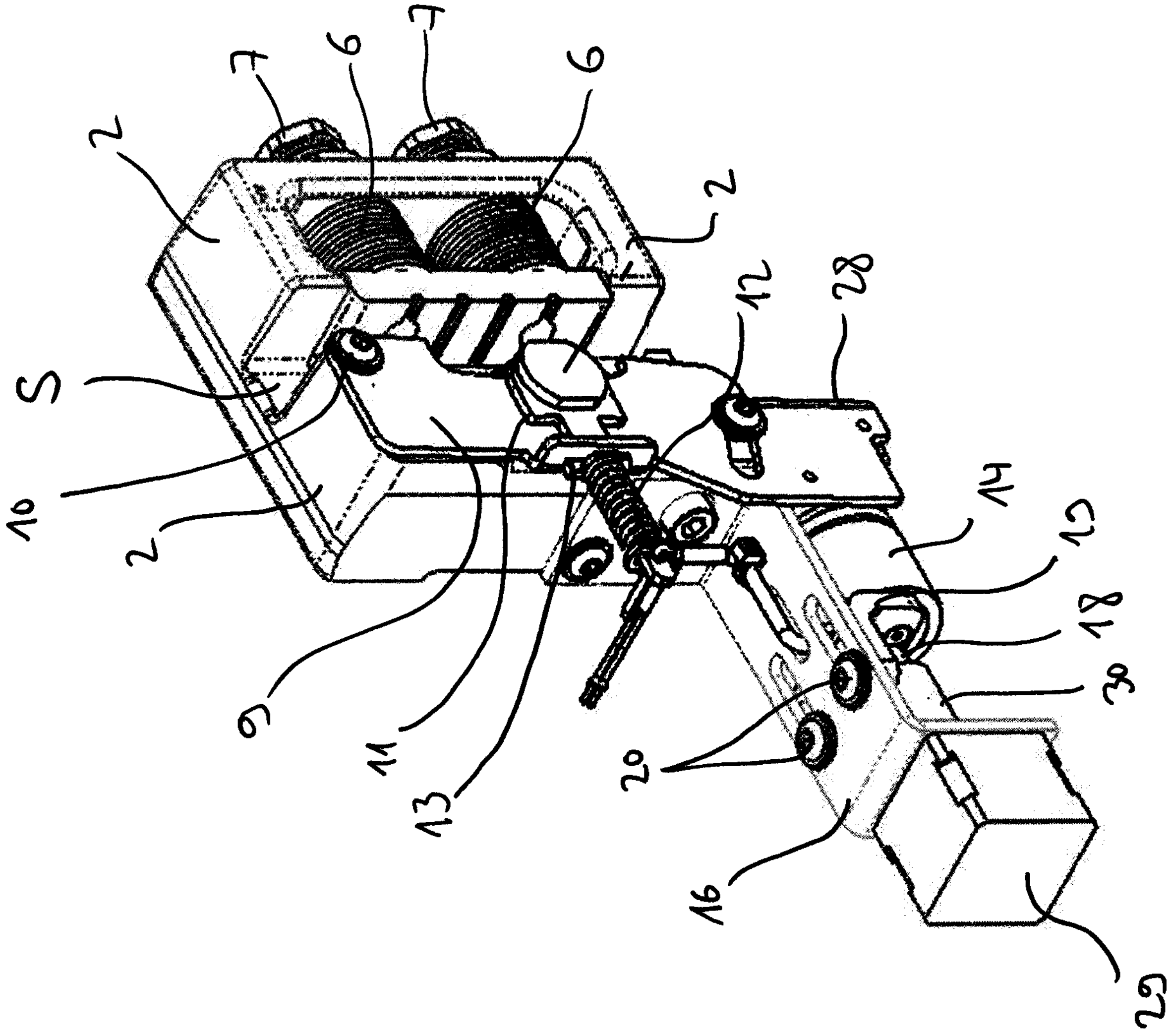
FIG. 5 shows the braking device according to the invention according to FIG. 1 in a perspective view from behind.
Figure 7:
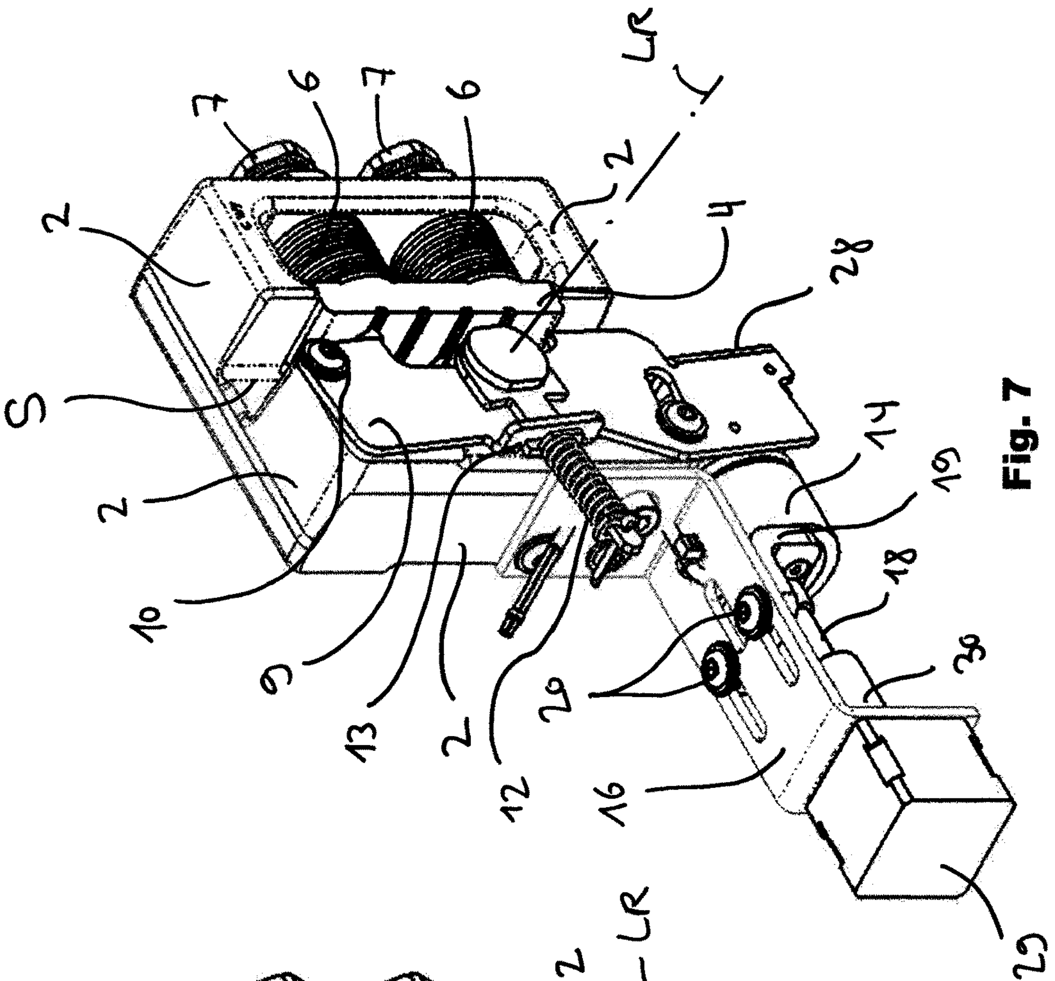
FIG. 7 shows the braking device according to the invention according to FIG. 3 in a perspective view from behind.
Figure 6:
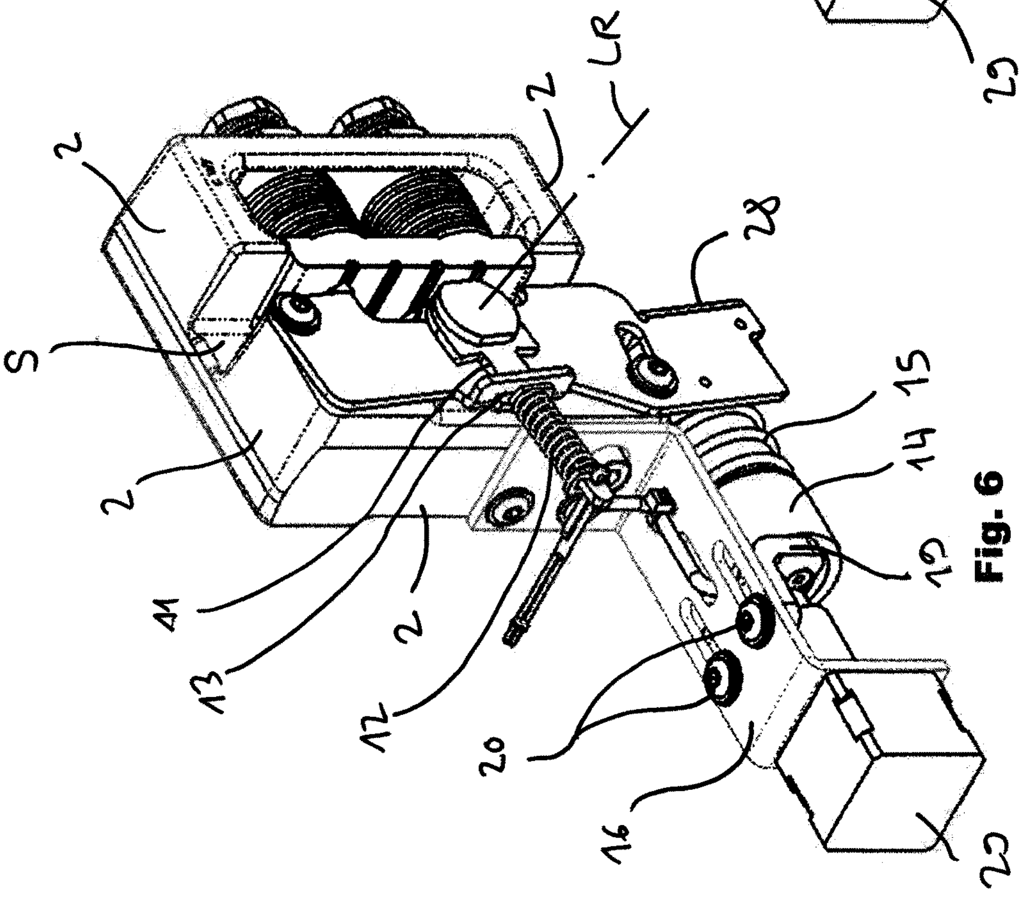
FIG. 6 shows the braking device according to the invention according to FIG. 2 in a perspective view from behind.

The best overview of an embodiment according to the invention is given by considering FIGS. 1 and 4 together.

The braking device 1 can be seen very clearly in FIG. 4. As can be seen, it comprises a basic body 2. In the ready-to-use state, the basic body 2 is preferably mounted in a floating manner on the car or the car frame of the elevator—in such a way that the basic body can move relative to the car and to the guide rail 3 in order to be able to center itself in relation to the guide rail without having to take the car with it. If necessary, it can also be attached to the counterweight, if the latter is exceptionally secured with its own braking device.

Typically, the car is guided on two parallel rails, so that two of the braking devices according to the invention are provided, in each case at least one per rail.

As illustrated in FIG. 1, this basic body 2 has a central slot S. In the properly assembled state, the slot S grasps over a rail 3 on its two opposite sides. The rail 3 can theoretically be an independent brake rail. As a rule, however, the rail 3 will be a guide rail which is already present and which guides the car or the counterweight along the shaft. In the following, the term guide rail is generally used.

As can best be seen from FIG. 1, the basic body holds a braking element in position on one side of the guide rail 3. In this embodiment, this braking element comprises a movable brake lining 4. This brake lining 4 is held by means of bolts 5. The bolts 5 can slide back and forth in corresponding guides F of the basic body 2. However, one or more spring elements 6, preferably in the form of disk spring packs, rest between the brake lining 4 and the corresponding part of the basic body 2. The exact position of the brake lining 4 with respect to the guide rail 2 can preferably be determined by means of adjusting nuts 7. The bolts 5 and the spring elements 6 here form further components of this braking element.

As can best be seen when viewing FIGS. 1 and 4 together, the basic body 2 holds a further braking element in position on the other side of the guide rail 3. This braking element comprises a brake roller 8, which will be discussed in more detail shortly. Another component of this braking element is the slotted link 9. The slotted link 9 is attached to the basic body 2 so as to be pivotable about the axis 10. The slotted link 9 holds a pendulum rod 11, which in turn holds the brake roller 8. The pendulum rod 11 is guided in a sliding and pivoting manner by the latter through a suitable plate 13. The plate 13 can be seen particularly well in FIG. 4. The brake roller 8 is connected to the slotted link 9 via this pendulum rod 11. The pendulum rod 11 holds a return spring 12, as will be described in more detail shortly. As can best be imagined on the basis of FIG. 1, under the compression of the return spring 12, the pendulum rod 11 can be displaced, together with the brake roller 8 carried by it, in the direction of the arrow P1. At the same time a pendulous, oscillating movement back and forth in both directions of the arrow P2 is possible. So the brake roller 8 is controlled by the slotted link 9, but is movable in relation to it in a specific area.

It can also be seen quite clearly on the basis of FIG. 1 that a retaining magnet 14 belongs to the braking device 1. An actuator 15 also belongs to it. In this case the actuator 15 is designed as a compression spring or helical compression spring. In the present embodiment, the actuator 15 has the tendency to pivot the slotted link 9 about its axis 10 towards the guide rail 3. As long as it is energized, however, the retaining magnet 14 prevents such pivoting. In the state shown here, it attracts a plate section 28, which here preferably is perpendicular to the drawing plane and is part of the slotted link 9. As a result, it holds the slotted link 9 in its position shown in FIG. 1.

It can also be seen from FIG. 1 that a support and guide rail 16 is fastened to the basic body 2. This support and guide rail 16 is preferably L-shaped. In any case, it holds a linear drive 17. In the present case, the linear drive 17 is designed as a spindle drive with a rotary spindle motor 29 and a screw spindle 18, which is particularly preferred. Alternatively, a real linear motor would also be conceivable, although not preferred, since a spindle drive has an optimal transmission ratio and is therefore very small and inexpensive. The retaining magnet 14, in turn, preferably holds at least one skid 19. The skid 19 is fastened to the support and guide rail 16 via at least one guide screw 20 so that it can be displaced in a sliding manner—in the present, preferred case, for this purpose the or each guide screw extends in an elongated hole in the support and guide rail.

It is worth mentioning at this point that the slotted link 9 optionally forms an additional sliding guide 21. If available, the sliding guide 21 interacts with the brake roller 8 as soon as it is driven in. The purpose and the more precise nature of this interaction are described in more detail in the context of the following explanations.

General Functioning of the Embodiment

The basic, optional, but clearly preferred functioning of the braking device 1 according to the invention can best be explained on the basis of the illustrations offered by FIGS. 4 and 8 to 12 for this purpose. FIGS. 8 to 12 are schematic illustrations. This explains the apparent differences to FIGS. 1 to 7. But that doesn't really matter. It is true that the braking device according to the invention according to FIGS. 1 to 7 can be designed logically, even if this is not shown in detail in the drawings, at least to the extent that FIG. 4 does not show it.

Figure 8:
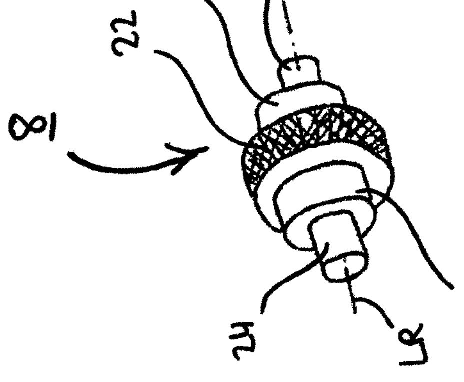
FIG. 8 shows a brake roller, as it can be used for the purposes of the invention, in the dismantled state.

First of all, the brake roller 8 should be explained with reference to FIGS. 8 and 4. The brake roller 8 has a main section 22 and an axis of rotation LR. The main section 22 generally has the largest outer diameter. It is preferably knurled on its lateral surface or treated in some other way to increase traction. A shoulder 23 is connected coaxially to each of the two end faces of the main section 22. In each case, the shoulder 23 is typically smooth-surfaced, mostly ground or provided with a defined roughness. A guide pin 24 which usually has a further reduced diameter compared to the shoulder 24 is connected coaxially to the free end face of at least one, mostly of both shoulders 23.

Then FIG. 9 will be explained.

It shows the principle of the braking device according to the invention as long as it is in its standby position, that is, it is not activated in regular operation.

The basic body 2, which is only hinted at here, can be clearly seen. Here, too, the basic body grasps over the guide rail 3 on two opposite sides. The brake lining 4 can also be seen clearly. It is held in position by the spring elements 6. The slotted link 9 is also clearly visible. It is held on the basic body 2 so as to be pivotable about the axis 10. The slotted gate 9 is held by the retaining magnet 14 by being magnetically attracted by the latter. In doing so, the retaining magnet 14 overcomes the force of the actuator 15, which has the tendency to pivot the slotted link 9 counterclockwise towards the guide rail 3. Finally, the sliding guide 21 can also be clearly seen, which here, in this basic embodiment, is incorporated into the slotted link 9 as a curved slot that is optionally closed all around.

The non-activated standby position shown in FIG. 9 is characterized in that the brake lining 4 is at a distance from the guide rail 3. The standby position shown in FIG. 9 is further characterized in that the brake roller 8 is held at a distance from the guide rail 3 by the slotted link 9. This is preferably done by means of a pendulum rod 11 (not shown in FIGS. 9 to 12) and its return spring 12. Both may, for example, be designed as shown in FIGS. 1 to 7.

In FIGS. 9 to 12, the slotted link 9 has been shown in a partially transparent fashion so that the following can be better explained, which can also be seen relatively well in FIG. 4:

As can be seen, a running surface 25 is incorporated into the basic body 2, see also FIG. 4. This has a groove-like recess 26 in its center, see also FIG. 4.

Next, FIG. 10 will be considered. It shows the principle of the braking device according to the invention after it has been triggered.

In this case the retaining magnet 14 has been switched. It then releases the slotted link 9. Under the influence of the force exerted by the actuator 15, which is also designed as a helical spring, the slotted link pivots counterclockwise in the direction of the guide rail 3. In doing so, it takes the brake roller 8 with it. The main section 22 of the brake roller 8 finally abuts against the guide rail 3. If, at this point in time, the car still has more than an insignificant speed, for example in a downward direction, the brake roller 8 is moved upward due to the friction between its main section 22 and the guide rail 3. As a result, it is driven into the gap between the guide rail 3 and the running surface 25—as shown in FIG. 11 in principle. This driving in of the brake roller 8 is possible because the pendulum rod 11 which holds the brake roller 8—and which is not shown in the drawing—can be pulled through the bracket 13 guiding it in the direction of the guide rail 3. At the same time, the pendulum rod 11 can be pivoted upwards or downwards because of the correspondingly large bracket opening.

In this respect the brake roller 8 is clamped between the points PH and PS. The point PH is the contact area between the shell of the main section 22 of the brake roller 8 and the guide rail 3. The point PS is the contact area between the shoulder 23 of the brake roller 8 and the running surface 25. On this side, the mostly knurled and possibly also hardened shell of the main section 22 of the brake roller protrudes into the groove-like recess 26 without touching its groove base. This means that there is a clearance between the aggressive, knurled surface of the shell of the main section 22 and the basic body 2. This protects the main body 2 from wear through aggressive knurling. Due to the clamping of the brake roller 8 between the guide rail 3 and the basic body 2, the basic body 2 moves relative to the guide rail 3. The basic body 2 is thereby moved in the direction along the arrows PB relative to the guide rail 3, preferably due to its floating mounting on the car or counterweight. As a result, the brake lining 4 is pressed against the surface of the guide rail 3. It develops correspondingly high frictional forces.

As can be seen in principle from FIG. 12, if the car or the counterweight still has a not insignificant speed at this point in time, the brake roller 8 is driven even further into the gap between the basic body 2 and the guide rail 3. In this case, the braking forces are preferably so great that the braking device is caught. It is then a progressive safety gear. The running surface 25 has a reinforced bevel/inclination in the region of its end. This is designed in such a way that it ultimately forms a stop which limits the maximum pull-in depth and on which the shoulders 23 can roll off flatly without causing scuffing damage. With this type of brake, the traction is generally set in such a way that the lateral surface of the main section 22 of the brake roller 8 rolls off the guide rail 3, while the shoulders 23 slide on the running surface 25. It should also be mentioned that an insert 27 can be provided in the area of the stop to control scuffing damage. This insert is either easily exchangeable (in the case of scuffing damage) or avoids scuffing damage in any case because it consists of a bearing metal or material.

The braking device 1 is preferably designed to act bidirectionally, as shown here. Then, analogously, the same thing happens when the braking device 1 is triggered during upwards travel. In this case, the only difference is that the brake roller 8 is driven into the wedge gap between the basic body 2 and the guide rail 3 by a downward movement.

When comparing FIGS. 10 and 11, a particularly advantageous option can be seen.

In the case of a correctly designed sliding guide 21, the slotted link 9 is pushed away from the guide rail 3, in the direction of the retaining magnet 14, by at least one guide pin 24 of the brake roller 8, when the brake roller 8 is driven in between the basic body 2 and the guide rail 3. As a result, during braking or catching the air gap is reduced or eliminated, which has opened up between itself and the slotted link 9 since the slotted link 9 has fallen off the holding magnet.

In order to deactivate the braking device 1 again, for example when the car is restarted, said automatic reduction or elimination of the air gap makes it possible to re-energize the retaining magnets 14. Then the car or the counterweight can be moved again in the opposite direction of travel. In this way, the brake roller 8 is moved out of the wedge gap between the basic body 2 and the guide rail 3. As soon as that has happened and the brake roller 8 is free again, it is pulled back by the pendulum rod 11, which is tensioned by the return spring 12, into its standby position, as shown in FIG. 9. The braking device 1 can therefore be released again in a fully automatic manner after a catch, without having to be reset manually.

Function of the Embodiment in Accordance with the Invention

FIG. 1 shows the embodiment according to the invention in regular operation at a point in time at which the braking device 1 is inactive because no braking effect should be generated. The braking device 1 is therefore in its standby position in FIG. 1.

Figure 2:
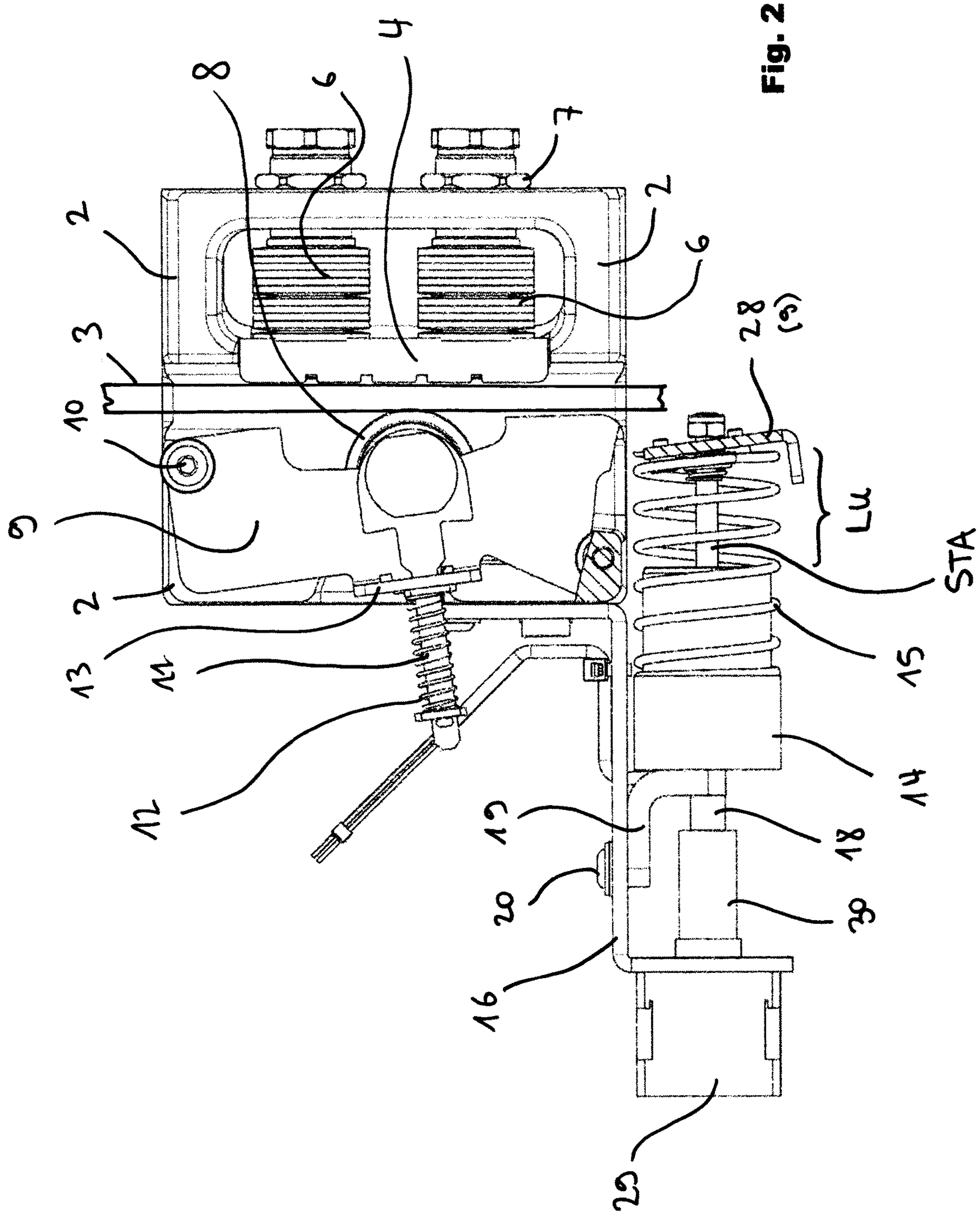
FIG. 2 shows a lateral view of the braking device according to FIG. 1, after the retaining magnet has been switched to the de-energized state, with the slotted link partially cut away.

In order to activate the braking device 1, the electromagnet is switched, so that a holding force collapses. FIG. 2 shows what happens then. In FIG. 2, the slotted link 9 is cut away in the area of the retaining magnet 14. In this way the retaining magnet behind it can be better seen.

As can be seen, the helical spring which represents the actuator 15 has pressed the plate section 28 of the slotted link 9 in the direction of the guide rail 3. As a result, the brake roller 8 abuts against the guide rail 3. At this point in time, the car may already be at a standstill or at least no longer move significantly. This is the case, for example, when the car is already at a stop and the brake roller 8 has only been placed prophylactically against the guide rail 3. Such a prophylactic placing can, for example, have the purpose of ensuring that the brake roller 8 is driven in and begins to brake, if an undesirable sneaking away of the car from its landing position takes place. If the feared sneaking away does not occur, however, the braking roller 8 is not driven in the gap between the basic body 2 and the guide rail 3. Instead, it then remains in the position shown in FIG. 2.

If the car is to start again and drive to the next stop, the braking device 1 must be deactivated again. For this purpose, the brake roller 8 is to be returned to its standby position. However, this does not succeed simply by re-switching the retaining magnet 14. This is because the air gap LU between the plate section 28, which here forms the magnet armature, and the end face of the retaining magnet 14 is too large. It is not possible for the retaining magnet 14 to attract the plate section 28 again across the large air gap LU against the resistance of the helical spring or the actuator 15 formed by it.

Figure 3:
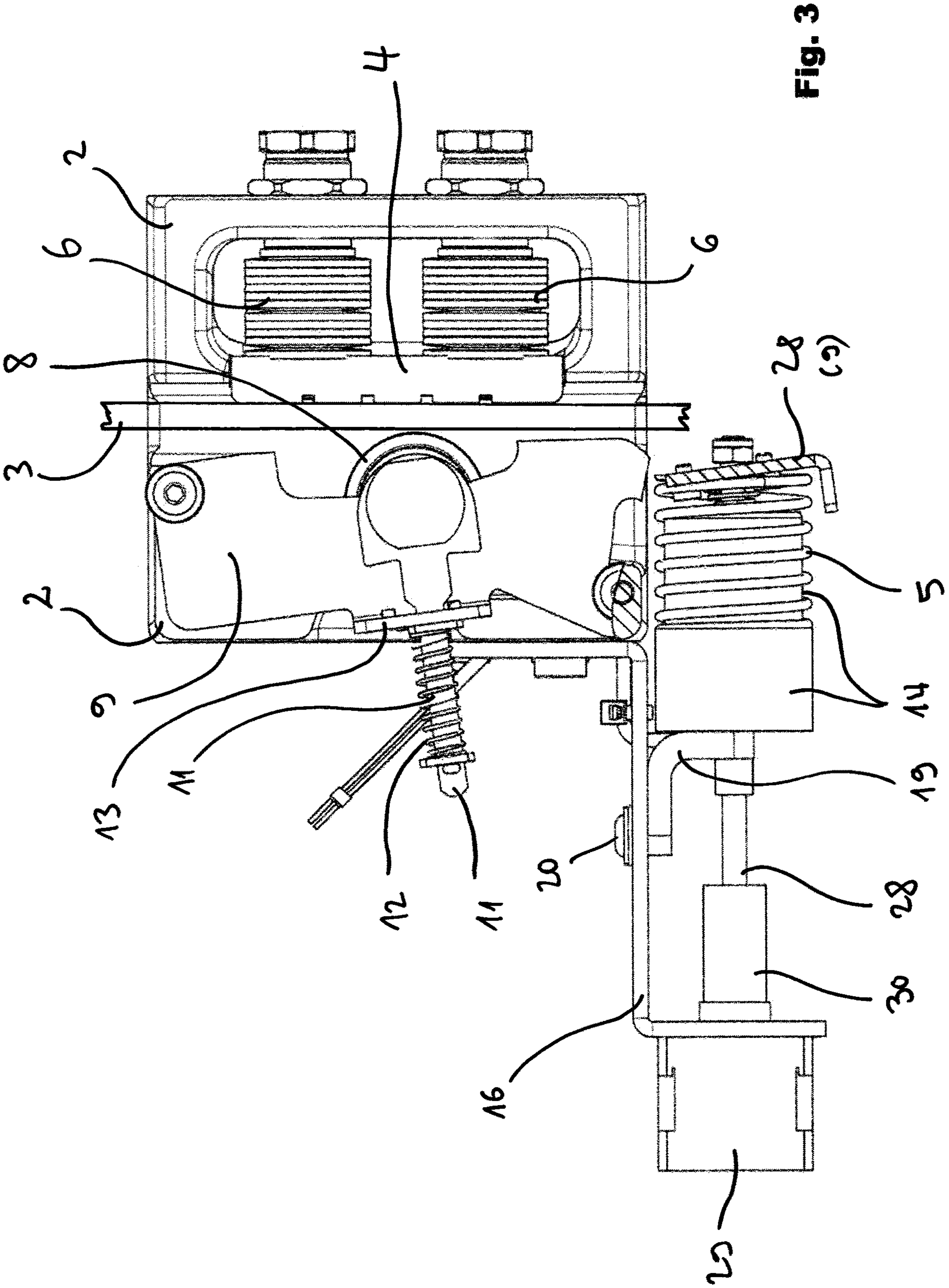
FIG. 3 shows a lateral view of the braking device according to FIG. 1, after the retaining magnet has been moved closer to the retaining element assigned to it by means of the linear drive in order to reduce the air gap.

In order to overcome this problem, the procedure shown in FIG. 3 is applied.

The linear drive 17 is actuated so that it moves the retaining magnet 14 in the direction of the guide rail 3. The actuation takes place until the air gap LU between the retaining magnet 14 and the magnet armature, which is preferably formed by the slotted link 9 or its plate section 28, is so small that the retaining magnet 14 can magnetically and reliably attract the plate section 28 again and hold it.

In the specific case in which the linear drive 17 is preferably designed as a spindle drive, this means that the spindle motor 29 is set in rotation. As soon as its motor hollow shaft 30, which is equipped with an internal thread, begins to rotate in the corresponding direction, the screw spindle 18 is unscrewed from the motor hollow shaft 30. Since its other end is attached to the retaining magnet 14 or to its at least one skid 19, the retaining magnet 14 is moved, purely translationally as a precautionary measure, in the direction of the guide rail 3. In this case, —due to its movable fixation by the guide screw 20—the at least one skid 19 slides along the support and guide rail 16. The latter is firmly connected to the basic body 2 or is even an integral part of the basic body 2.

As soon as the retaining magnet 14 securely holds the magnet armature and thus the plate section 28 again, which can be seen, for example, on the basis of its corresponding, characteristic power consumption, the linear drive 17 is actuated in the opposite direction. It now pulls the retaining magnet 14, together with the plate section 18 which is magnetically attracted and held by it, in the direction of the guide rail 3. As a result, the linear drive 17 causes the slotted link 9 to pivot clockwise back into its standby position. In doing so, the slotted link 9 takes the brake roller 8 with it, back into its standby position. In the specific case, the slotted link 9 exerts the corresponding return force on the brake roller 8 via its bracket 13, the return spring 12 and the pendulum rod 11.

In general, in view of FIGS. 1 to 3, it should be noted that it is particularly advantageous, if the linear drive is positioned in such a way that it generates a translational movement that goes back and forth in a substantially perpendicular manner to the guide rail 3. However, a movement in the direction of the guide rail is also conceivable. Ideally, the housing of the retaining magnet 14 has a shoulder with a reduced diameter. This reduced diameter forms a seat or an internal guide for the helical spring which here forms the actuator 15.

It is also remarkable that the plate section 18 has a hole. A rod STA of the retaining magnet 14 extends through this hole, with the end of the rod holding a screw or a split pin or a clip that prevents the plate section 28 from gliding off the rod STA. The said hole is designed so generously that the rod STA of the retaining magnet 14 can pivot freely back and forth in this hole. In this way the spring forming the actuator 15 can be securely held between the retaining magnet 14 and the plate section 28.

It is particularly favourable, if the support and guide rail 16 is a component which is initially separate from the basic body 2 and which is screwed or riveted to it. In this way, it is possible to retrofit already existing braking devices of this type so that they can be deactivated again without having to be manually active or having to apply the brake or catch beforehand.

It is particularly advantageous if the triggering of the braking device takes place completely independently of the releasing of the braking device and therefore also functions when the linear drive has failed—as is the case, for example, in this embodiment.

Concluding Remarks Concerning Patent Law

In order to put a stop to possible attempts to circumvent the patent in advance, the following comment appears to be fundamentally appropriate:

On the basis of the abstract general functional drawing according to FIG. 13 it can be seen that the air gap reducing agent is ideally, but not necessarily, a linear drive that moves the retaining magnet 14 back and forth.

From a purely physical point of view, it is also possible to reduce or eliminate the air gap by means of one or more movable pole pieces K1 and K2. Each of the pole pieces forms a flat, wedge-shaped tongue with a slight slope. The wedge-shaped tongues of the pole pieces K1 and K2 are oriented in opposite directions and together form a flat top and bottom side. The pole pieces K1 and K2 are made of magnetically conductive material (e.g. steel). They are inserted from both sides into the air gap LU, which is initially too large for the plate section 28 to be attracted again by the retaining magnet 14. They close the air gap completely or substantially, as shown in FIG. 13. The retaining magnet 14 can attract the plate section 28 again with great force via the pole pieces, although, for this purpose, the retaining magnet 14 is actually too far away from the plate section 28.

The pole pieces are then laterally pulled out of the air gap LU by the tensile forces Z1 and Z2 in the opposite direction, preferably at the same speed, whereby they slide off the plate section 28 or the retaining magnet 14. In this way the plate section 28 and thus the magnet armature is continuously brought closer and closer to the retaining magnet 14, without a disruptive air gap occurring again. At the very end, when the pole pieces finally leave the area between the plate section 28 and the retaining magnet 14, the plate section 28 "jumps" onto the retaining magnet 14.

By the way, —regardless of the claims made up to now—independent protection for a braking device is claimed, which, for the purpose of deactivation, after the brake has fallen off without causing a braking effect, has a drive driven by external, preferably electrical energy.

The brake claimed in this way can additionally have one or more features disclosed in the above description and/or in the claims and/or in the associated figures.

The invention claimed is:

1. A braking device for an elevator with a rail-guided car, wherein the braking device comprises:

a basic body for mounting on the car or on a counterweight which, when properly installed, encompasses a guide rail and holds a first braking element in position on a first side of the guide rail and holds a second braking element in position on a second side of the guide rail opposite the first side of the guide rail, wherein at least one of the first and second braking elements is held in a standby position, at a distance from the guide rail, by a switchable retaining magnet against a force of an automatic actuator, such that, when switching the retaining magnet, one of the first and second braking elements is pressed by the actuator against the guide rail, away from the retaining magnet, so that an air gap between the retaining magnet and the first or second braking element occurs or becomes larger, wherein the braking device is designed in such a way that the first or second braking element is automatically driven in between the basic body and the guide rail, if the car moves more than just insignificantly at a point in time at which the first or second braking element abuts against the guide rail, wherein the retaining magnet is equipped with an air gap reducing agent, which prevents the first or second braking element from being attracted again, which reduces or eliminates the air gap between the retaining magnet and the first or second braking element which is triggered but not yet having a braking effect and contacting the rail, which has not yet been driven in between the guide rail and the basic body in such a way that the retaining magnet keeps the first or second braking element magnetically trapped again, as soon as the retaining magnet is switched accordingly, wherein the force generated by the actuator is smaller than the force generated by the retaining magnet.

2. The braking device according to claim 1, wherein the air gap reducing agent is realized by a guide along which the retaining magnet can be moved in and opposite a direction of the braking element resting on the guide rail, and by a drive causing such displacement.

3. The braking device according to claim 2, wherein the drive comprises a motor-driven screw spindle.

4. The braking device according to claim 3, wherein the screw spindle is designed to be self-locking in such a way that the screw spindle does not begin to rotate in a direction of a longitudinal axis of the screw spindle under an influence of pure forces.

5. The braking device according to claim 2, wherein the drive tensions the actuator when the drive reduces and eliminates the air gap.

6. An elevator with a car moving along guide rails along an elevator shaft and a counterweight, wherein the car holds the braking device according to claim 1.

7. The elevator according to claim 6, wherein the car moves along guide rails in a vertical direction.

8. The braking device according to claim 1, wherein the basic body is mounted on the car or on the counterweight by a floating mounting.

* * * * *